(12) United States Patent
Butzmann et al.

(10) Patent No.: US 7,119,535 B2
(45) Date of Patent: Oct. 10, 2006

(54) ANGULAR DISPLACEMENT ENCODER WITH TWO MAGNETIC TRACKS

(75) Inventors: Stefan Butzmann, Hagen (DE); Stefan Pusch, Hamburg (DE); Michael Hinz, Hamburg (DE); Gunnar Schulz, Hamburg (DE); Marcus Weser, Hamburg (DE); Thomas Stork, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 146 days.

(21) Appl. No.: 10/518,847

(22) PCT Filed: Jun. 13, 2003

(86) PCT No.: PCT/IB03/02925

§ 371 (c)(1),
(2), (4) Date: Dec. 21, 2004

(87) PCT Pub. No.: WO2004/003480

PCT Pub. Date: Jan. 8, 2004

(65) Prior Publication Data

US 2006/0055397 A1    Mar. 16, 2006

(30) Foreign Application Priority Data

Jun. 27, 2002   (DE)   ............................... 102 28 663

(51) Int. Cl.
*G01B 7/30*         (2006.01)

(52) U.S. Cl. .............................. 324/207.25; 324/207.24
(58) Field of Classification Search ........... 324/207.25, 324/207.24
See application file for complete search history.

(56) References Cited

U.S. PATENT DOCUMENTS 4,274,053 A      6/1981   Ito et al. ..................... 324/174
5,574,364 A  *  11/1996   Kajimoto et al. ...... 324/207.12

FOREIGN PATENT DOCUMENTS

JP            57165702 A     10/1982

* cited by examiner

*Primary Examiner*—Bot LeDynh
(74) *Attorney, Agent, or Firm*—Aaron Waxler; Paul Im

(57) ABSTRACT

What is described is a configuration for determining the position of a body along a movement direction, wherein the body is in the form of a magnetized encoder with two magnetic tracks extending, on one surface of the body, along the movement direction, at least essentially in parallel with one another, wherein, at specified intervals along the movement direction, a first of the magnetic tracks exhibits magnetized sections in which the magnetic north poles are aligned so as to be at least largely coincident in a magnetization direction that is essentially at right-angles to the surface of the body, and wherein, at intervals specified to coincide with the above-mentioned intervals along the movement coordinate, the second of the magnetic tracks exhibits magnetized sections in which the magnetic south poles are aligned so as to be at least largely coincident in the said magnetization direction, and wherein, in each case, a magnetized section of one of the magnetic tracks is located at least largely centrally in relation to a gap between two magnetized sections of the other magnetic track, with a magnetoresistive sensor, in the form of an angle sensor, which is arranged above the magnetic tracks, for determining the directions of magnetic fields brought about by the magnetized sections of the magnetic tracks in an area extending along the movement coordinate, essentially in parallel with the surface of the body. By virtue of the invention, a simple configuration for the precise determination of the position of a body along a movement direction is created, wherein this configuration does not necessarily have to be affixed centrally upstream of the head of the body.

8 Claims, 3 Drawing Sheets

ANGULAR DISPLACEMENT ENCODER WITH TWO MAGNETIC TRACKS

The invention relates to a configuration for determining the position of a body along a movement coordinate.

Magnetoresistive sensors find diverse applications in the automotive sector. In particular, angle sensors are used here for ascertaining the angles of rotation of the most diverse moving structural components, e.g. in steering systems, in ascertaining pedal positions or determining the position of the throttle valve in vehicle engines. The angle sensor may hereby be affixed upstream of a permanent magnet connected to the rotatable structural component, so that the angular position of the structural component can be concluded from the angle between the angle sensor and the permanent magnet measured by the angle sensor.

A schematic representation of an example of a configuration of this kind is shown in FIG. 1. Herein, a rotatable structural component, e.g. a shaft or similar, is indicated with the reference 1. Centrally in relation to its rotation axis 2, a permanent magnet 3 is affixed to an end face 4 of the rotatable structural component 1 in such a way that it rotates with structural component 1. Permanent magnet 3 is equipped with a north pole 5 and a south pole 6. Opposite permanent magnet 3, likewise centrally in relation to rotation axis 2, an angle sensor 7 is permanently affixed, i.e. it does not rotate with structural component 1. When structural component 1 rotates about rotation axis 2 along a rotation coordinate 8, the rotation angle of structural component 1 is measured along this rotation coordinate 8 by angle sensor 7.

A configuration of this kind presupposes that the angle sensor and the permanent magnet can be affixed to the rotation axis of the rotatable structural component upstream of its head.

From U.S. Pat. No. 4,274,053, a rotating magnetic encoder for determining the absolute value of an angular displacement which uses resistors sensitive to magnetic fields is known. A drum-shaped, disk-shaped or cup-shaped, rotating component can be affixed to a rotatable shaft. A magnetic medium, divided into a multiplicity of tracks, is provided on one surface of the rotating component. Each of the tracks generates magnetic fields which change in their amount and direction with the rotation of the rotating component. As an alternative, a multiplicity of permanent magnets are provided on the surface of the rotating component to generate the changing magnetic field with the rotation of the rotating component. A multiplicity of resistors sensitive to magnetic fields are provided in the vicinity of the rotation paths of the tracks, and generate analog signals which represent a measure of the changes in the electrical resistance values of the magnetic-field-sensitive resistors. A rotation-state detector receives the analog signal and generates digital signals and/or an analog signal, which constitute(s) a measure of the angular position of the rotatable shaft, shown as an absolute value.

With this configuration, for a sufficiently fine resolution in determining the angular position of the shaft, a correspondingly large number of tracks and associated magnetic-field-sensitive resistors is required. This makes the configuration extremely complex.

It is an object of the invention to create a simple configuration for the precise determination of the position of a body along a movement coordinate, wherein this configuration does not necessarily have to be affixed centrally upstream of the head of the body.

This object is achieved in accordance with the invention by means of a configuration for determining the position of a body along a movement coordinate, wherein the body is in the form of a magnetized encoder with two magnetic tracks extending, on one surface of the body, along the movement coordinate, at least essentially in parallel with one another, wherein, at specified intervals along the movement coordinate, a first of the magnetic tracks exhibits magnetized sections in which the magnetic north poles are aligned so as to be at least largely coincident in a magnetization direction that is essentially at right-angles to the surface of the body, and wherein, at intervals specified to coincide with the above-mentioned intervals along the movement coordinate, the second of the magnetic tracks exhibits magnetized sections in which the magnetic south poles are aligned so as to be at least largely coincident in the said magnetization direction, and wherein, in each case, a magnetized section of one of the magnetic tracks is located at least largely centrally in relation to a gap between two magnetized sections of the other magnetic track, with a magnetoresistive sensor in the form of an angle sensor, which is arranged above the magnetic tracks, for determining the directions of magnetic fields brought about by the magnetized sections of the magnetic tracks in an area extending along the movement coordinate, essentially in parallel with the surface of the body.

The configuration in accordance with the invention has the advantage that it is constructed in a simple, robust manner, even for a high resolution in determining the position of the body along the movement coordinate. It is furthermore not dependent on being affixed at a specific position on the body, but can be used extremely flexibly. This is an advantage especially if restrictive conditions exist in relation to the affixing of the magnetic tracks or a permanent magnet for which the magnetic field is to be ascertained by the angle sensor, i.e. if, for example, these magnetic tracks or this permanent magnet cannot be directly affixed to a rotary shaft of a rotating encoder for structural reasons.

Corresponding, advantageous developments of the invention are represented in the dependent claims.

The invention will be further described with reference to examples of embodiments shown in the drawings, to which, however, the invention is not restricted.

Figure 1:
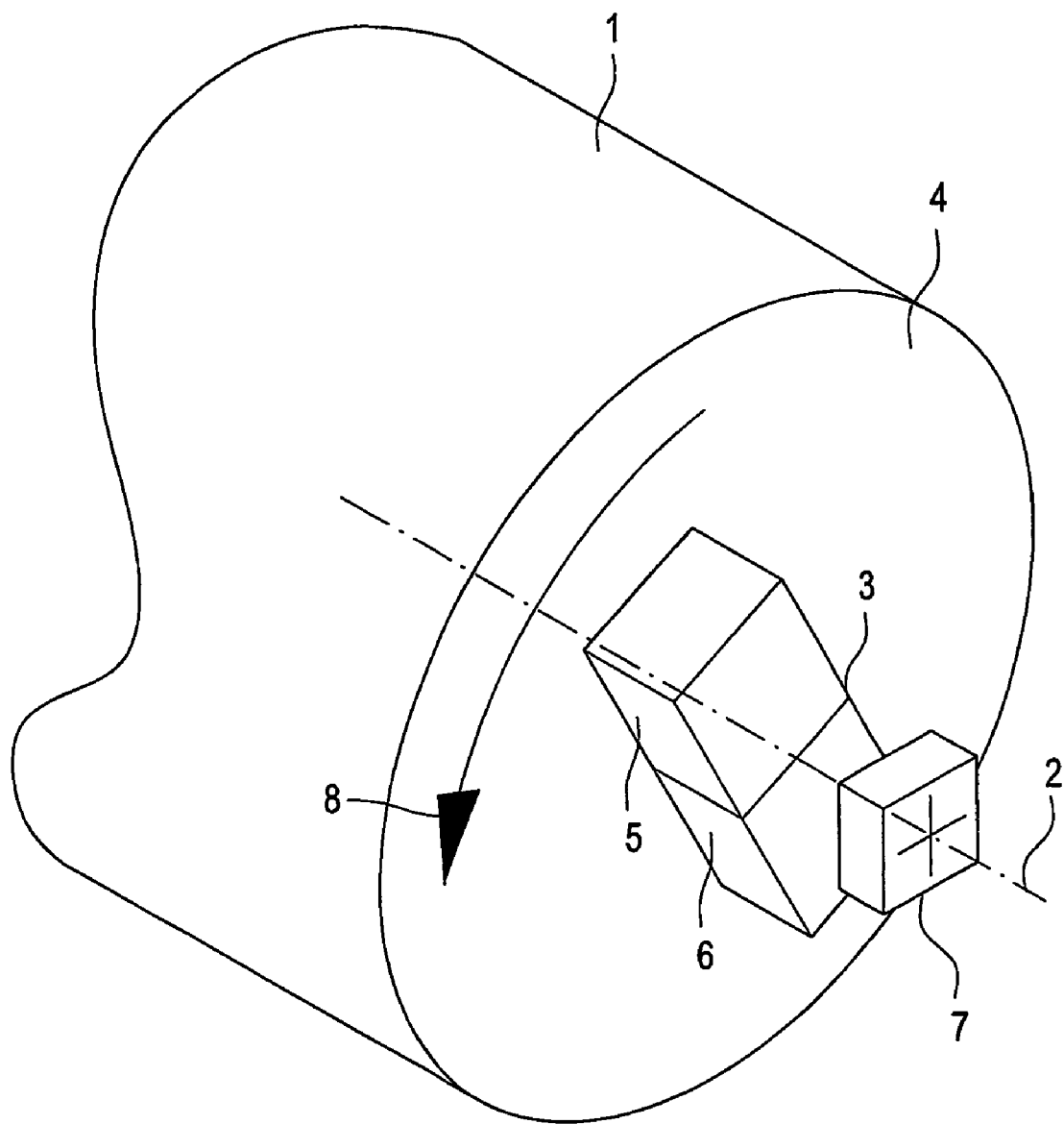
FIG. 1 shows an example of a configuration for determining the rotation angle of a rotatable structural component, e.g. a shaft, with a permanent magnet and an angle sensor, which are affixed upstream of the head of the rotatable structural component.
Figure 2:
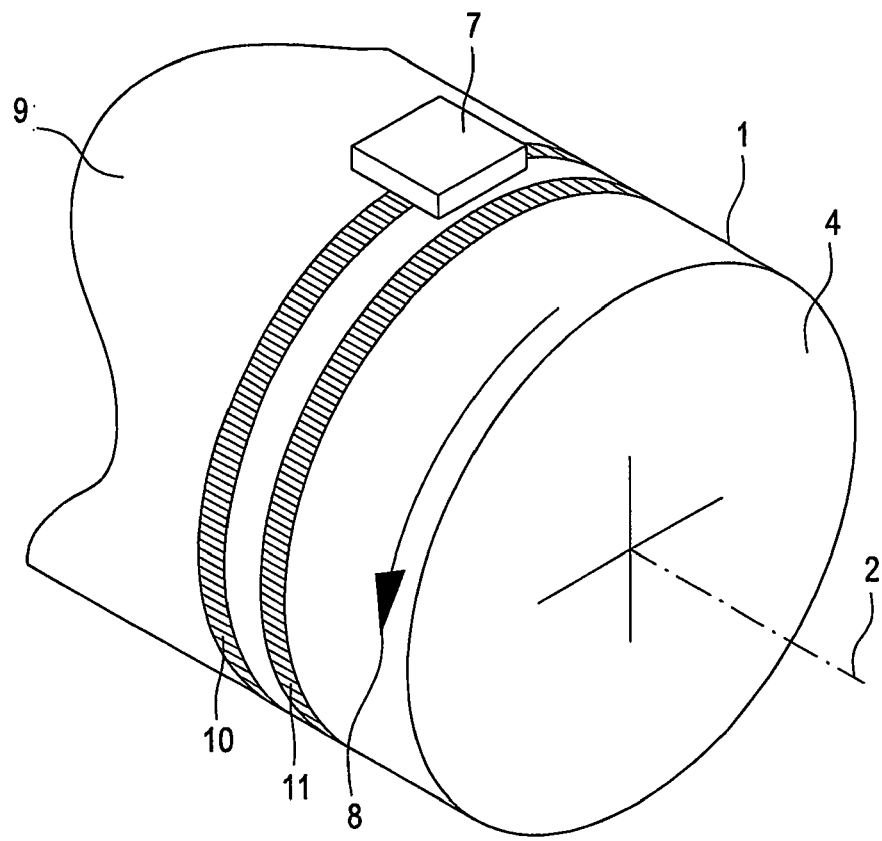
FIG. 2 shows a first embodiment of the invention.

Again selected in FIG. 2 as the body designed as a magnetized encoder and whose position along a movement coordinate is to be determined, is the rotatable structural component in accordance with FIG. 1, i.e. the shaft 1 shown therein. Its end face 4 remains free, however; instead, two magnetic tracks 10, 11 are affixed on a lateral surface 9 of shaft 1, extending, at least essentially in parallel with one another, along the movement coordinate in the form of rotation coordinate 8, as in FIG. 1, i.e. these magnetic tracks 10, 11 run in the peripheral direction of shaft 1.

Figure 3:
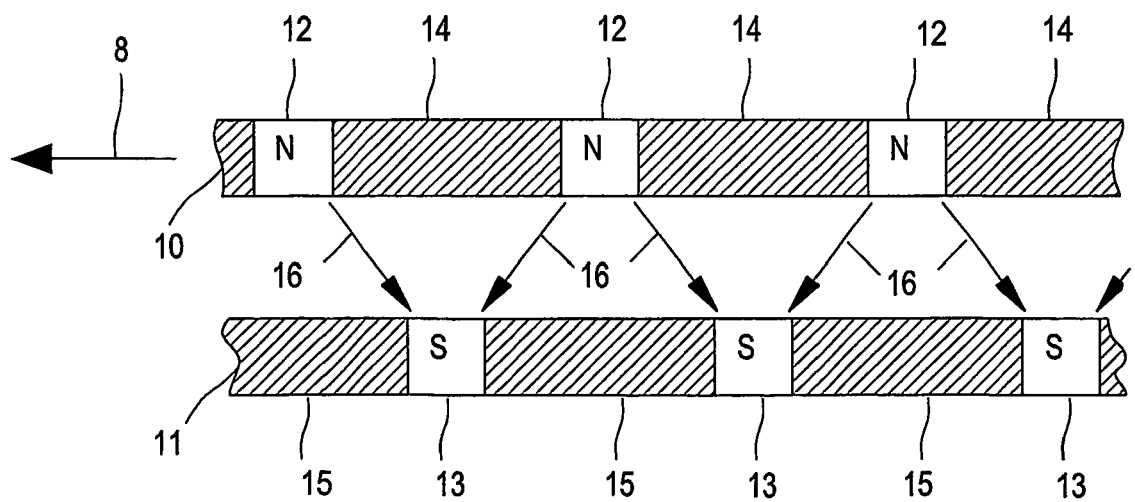
FIG. 3 shows a schematic representation of one embodiment of the magnetic tracks in the configuration in accordance with FIG. 2.

An example of the design of magnetic tracks 10, 11 of this kind is shown in FIG. 3. The first of these magnetic tracks, indicated with reference 10, exhibits, at specified intervals along movement coordinate 8, magnetized sections 12 in which the magnetic north poles N are aligned so as to be at least largely coincident in a magnetization direction extending essentially at right-angles to the lateral surface 9 of shaft 1. The second magnetic track 11 exhibits, at intervals specified to coincide with the above-mentioned intervals along the movement coordinate 8, magnetized sections 13 in which the magnetic south poles S are aligned so as to be at least largely coincident in the said magnetization direction, and wherein, in each case, a magnetized section 12 or 13 of one of the magnetic tracks 10 or 11 respectively is located at least largely centrally in relation to a gap 15 or 14 respectively between two magnetized sections 13 or 12 respectively of the other magnetic track 11 or 10 respectively, with a magnetoresistive sensor in the form of an angle sensor 7, arranged above the magnetic tracks 10, 11, for determining the directions of magnetic fields brought about by the magnetized sections 12, 13 of the magnetic tracks 10, 11 in an area extending along the movement coordinate 8, essentially in parallel with the surface of the body, i.e. in parallel with lateral surface 9 of shaft 1. The arrows with reference 16 indicate the direction of magnetic fields brought about by the magnetized sections 12, 13 of magnetic tracks 10, 11.

If shaft 1 is now rotated about rotation axis 2, and magnetic tracks 10, 11 are thereby moved along rotation coordinate 8 opposite angle sensor 7, the direction 16 of the magnetic fields brought about by the magnetized sections 12, 13 of magnetic tracks 10, 11 changes along this rotation coordinate 8. This is detected by angle sensor 7, which thereby ascertains the movement of shaft 1 along rotation coordinate 8.

If multiple magnetized sections 12 and 13 are arranged on the periphery of shaft 1 in each of magnetic tracks 10, 11, each direction detected by angle sensor 7 of the magnetic fields brought about by the magnetized sections 12, 13 of magnetic tracks 10, 11, repeats itself multiple times in an identical quantity along the periphery of shaft 1. An angular measured value detected by angle sensor 7 therefore occurs a corresponding multiple number of times during a revolution of shaft 1. This ambiguity is, however, not significant in many applications; rather, it is sufficient for determining the position of the body along the movement coordinate, i.e. of shaft 1, for example, along rotation coordinate 8 within an area predetermined by the interval between two adjacent magnetized sections 12 or 13 of magnetic tracks 10 or 11 respectively, wherein it is of no consequence in which of these areas, i.e. opposite which of these sections 12 or 13, angle sensor 7 is currently located. An application example of this kind exists e.g. in determination of the position of the rotor in multipolar, permanently-excited synchronous machines. Hereby, the pole pitch of the synchronous machine and the subdivision of the magnetized sections 12, 13 of magnetic tracks 10, 11 are preferably selected to be coincident, wherein shaft 1 is formed by the rotor shaft of the synchronous machine.

In the embodiment described above, the specified intervals of the magnetized sections 12, 13 are identical on both magnetic tracks 10, 11 along movement coordinate 8 of the encoder, i.e. shaft 1, over the entire extent of magnetic tracks 10, 11 along the periphery of shaft 1.

Figure 4:
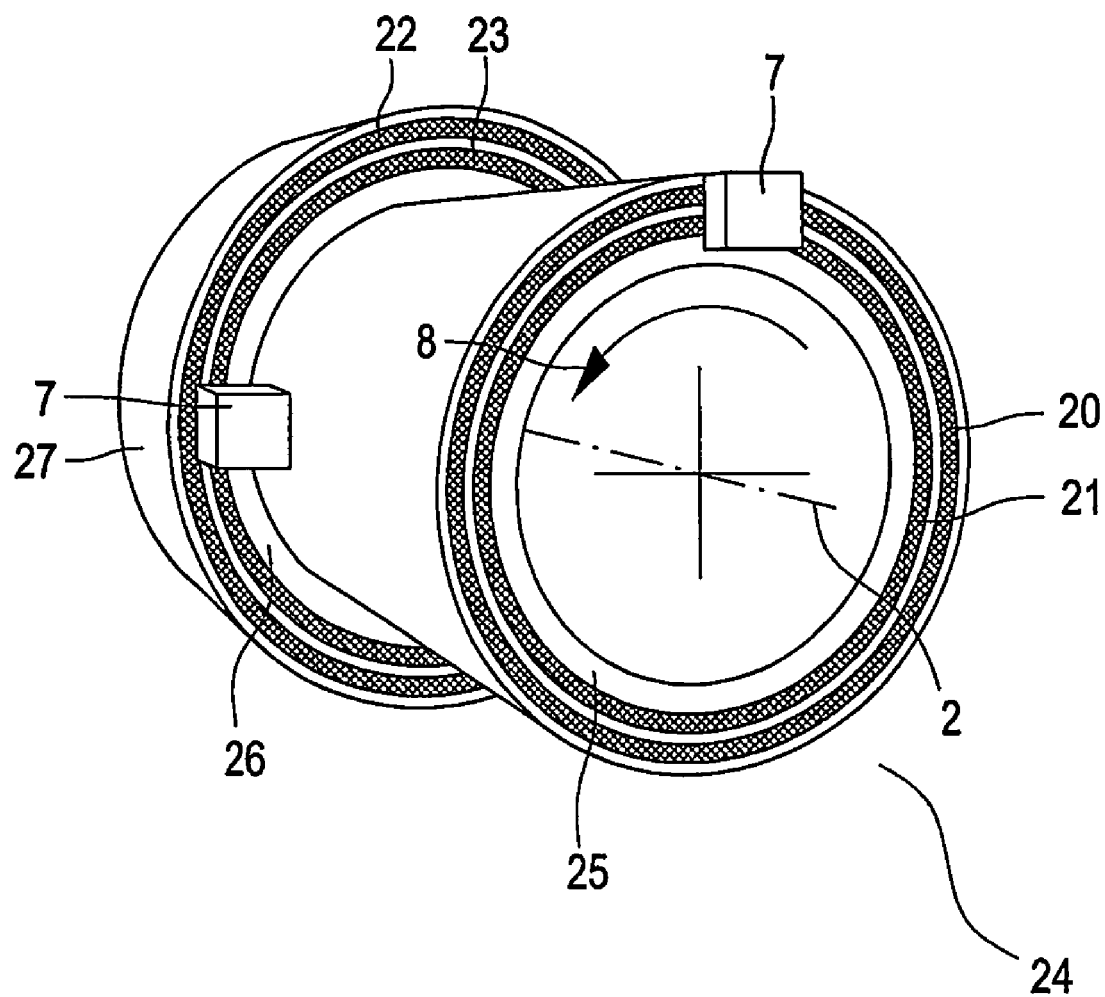
FIG. 4 shows a second embodiment of the invention.

FIG. 4 shows further examples of an embodiment of the magnetic tracks in accordance with the invention, which are here identified with references 20, 21 and 22, 23, and their arrangement on the surface of a body 24 moving along a movement coordinate. A rotary movement of body 24 about the rotation axis 2 along rotation coordinate 8 is again shown by way of example. The end of body 24 is in the form of a hollow shaft with a circular end face 25 on which are located the magnetic tracks 20, 21 in a circle, concentric in relation to rotation axis 2. The magnetization of these magnetic tracks 20, 21 is of a form corresponding to the embodiments in the example in FIG. 2 and FIG. 3. If desired, magnetic tracks, identified with 22, 23, may also be arranged on an end face 26 of an additional carrier 27, which is present on body 24 as an essentially rotationally symmetrical, disk-like shape, concentric in relation to rotation axis 2. Magnetic tracks 22, 23 are arranged on end face 26 of disk-like shape 27 in a circle, concentrically in relation to rotation axis 2.

In a different embodiment, not shown in the drawing, the magnetic tracks may also be arranged linearly on a body, which moves along an at least largely straight movement coordinate. The invention may thereby also be used to form linear pick-up transducers.

The invention claimed is:

1. A configuration for determining the position of a body along a movement coordinate, wherein the body is in the form of a magnetized encoder with two magnetic tracks extending, on one surface of the body, along the movement coordinate, at least essentially in parallel with one another, wherein, at specified intervals along the movement coordinate, a first of the magnetic tracks exhibits magnetized sections in which the magnetic north poles are aligned so as to be at least largely coincident in a magnetization direction that is essentially at right-angles to the surface of the body, and wherein, at intervals specified to coincide with the above-mentioned intervals along the movement coordinate, the second of the magnetic tracks exhibits magnetized sections in which the magnetic south poles are aligned so as to be at least largely coincident in the said magnetization direction, and wherein, in each case, a magnetized section of one of the magnetic tracks is located at least largely centrally in relation to a gap between two magnetized sections of the other magnetic track, with a magnetoresistive sensor, in the form of an angle sensor, which is arranged above the magnetic tracks, for determining the directions of magnetic fields brought about by the magnetized sections of the magnetic tracks in an area extending along the movement coordinate, essentially in parallel with the surface of the body.

2. A configuration as claimed in claim 1, characterized in that the specified intervals of the magnetized sections are identical on both magnetic tracks along the movement coordinate of the encoder over the entire extent of the magnetic tracks.

3. A configuration as claimed in claim 1, characterized in that the surface of the body is essentially planar in design, and the magnetic tracks are arranged essentially linearly on this surface.

4. A configuration as claimed in claim 1, characterized in that the surface of the body is essentially rotationally symmetrical in design, and the magnetic tracks are arranged on this surface so as to be essentially rotationally symmetrical.

5. A configuration as claimed in claim 4, characterized in that the body is at least virtually cylindrical in design, and the magnetic tracks are arranged on a lateral surface of the body.

6. A configuration as claimed in claim 4, characterized in that the body is at least virtually cylindrical in design, and the magnetic tracks are arranged concentrically in a circle on an end face of the body.

7. A configuration as claimed in claim 6, characterized in that the body is designed as a hollow shaft, and the magnetic tracks are arranged concentrically in a circle on an end face of the hollow shaft.

8. A configuration as claimed in claim 6, characterized in that the body is essentially rotationally symmetrical in design, with an essentially rotationally symmetrical, disk-like shape, and the magnetic tracks are arranged on an end face of the disk-like shape concentrically in a circle.

* * * * *